(12) United States Patent
Mason

(10) Patent No.: US 11,086,404 B2
(45) Date of Patent: Aug. 10, 2021

(54) GESTURE IDENTIFICATION

(71) Applicant: PAYPAL, INC., San Jose, CA (US)

(72) Inventor: Robert A. Mason, Santa Monica, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/454,968

(22) Filed: Jun. 27, 2019

(65) Prior Publication Data

US 2019/0384412 A1    Dec. 19, 2019

Related U.S. Application Data

(63) Continuation of application No. 15/723,845, filed on Oct. 3, 2017, now Pat. No. 10,338,691, which is a continuation of application No. 14/039,677, filed on Sep. 27, 2013, now Pat. No. 9,785,241.

(60) Provisional application No. 61/870,179, filed on Aug. 26, 2013.

(51) Int. Cl.
| | |
|---|---|
| *G06F 3/01* | (2006.01) |
| *G06F 3/00* | (2006.01) |
| *G06F 3/03* | (2006.01) |
| *G06F 21/31* | (2013.01) |
| *G06F 21/00* | (2013.01) |

(52) U.S. Cl.
CPC .............. *G06F 3/017* (2013.01); *G06F 3/005* (2013.01); *G06F 3/0304* (2013.01); *G06F 21/00* (2013.01); *G06F 21/31* (2013.01)

(58) Field of Classification Search
CPC ........ G06F 3/017; G06F 3/005; G06F 3/0304; G06F 21/00
See application file for complete search history.

(56) References Cited

U.S. PATENT DOCUMENTS

| | | | | |
|---|---|---|---|---|
| 2010/0149090 A1* | 6/2010 | Morris | ..................... | G06F 3/017 345/156 |
| 2012/0050530 A1* | 3/2012 | Raman | ..................... | G06F 3/017 348/142 |
| 2012/0233073 A1* | 9/2012 | Salmon | ................ | G06Q 20/381 705/44 |
| 2013/0321279 A1* | 12/2013 | Engle | ....................... | G06F 3/017 345/168 |
| 2014/0049480 A1* | 2/2014 | Rabii | ..................... | G06F 1/3262 345/173 |
| 2014/0155032 A1* | 6/2014 | Anson | ................... | H04L 63/083 455/411 |

* cited by examiner

*Primary Examiner* — Sahlu Okebato
(74) *Attorney, Agent, or Firm* — Haynes and Boone, LLP

(57) ABSTRACT

Various methods and systems are provided to allow a user to perform finger gesture motions, such as making typing, swiping, tapping, or other types of finger motions to provide device input, such as typing, clicking, or selecting data into a webpage, application, operating system, or toolbar, that was normally performed by the user having to use a keyboard, mouse, stylus, microphone, touchscreen, or another input device.

20 Claims, 4 Drawing Sheets

GESTURE IDENTIFICATION

CROSS REFERENCE TO RELATED APPLICATION

This application is a Continuation Application to U.S. patent application Ser. No. 15/723,845, filed on Oct. 3, 2017, entitled "Gesture Identification", which in turn is a Continuation Application to U.S. patent application Ser. No. 14/039,677, filed on Sep. 27, 2013, entitled "Gesture Identification", which in turn claims priority to U.S. Provisional Patent Application Ser. No. 61/870,179, filed on Aug. 26, 2013, entitled "Gesture Identification", the disclosures of which are incorporated herein by reference in their entirety.

BACKGROUND

Field of the Invention

The present invention generally relates to gesture identification, and in particular, recognizing finger motions to perform typing, navigation, and other actions on mobile devices.

Related Art

In a typical financial transaction involving a payment provider, a request is made to the payment provider to authorize a payment or a money transfer. The request is made by a payee, such as a merchant, seller, or recipient, or by a payer, such as a consumer, purchaser, or sender, when the payment is ready to be made. The payment provider may request certain information necessary to process the payment, such as a name, address, phone number, credit or debit card number, account number, payee information, transaction information, and/or other billing information from the payer. The payment provider then processes the payment request and returns an authorization, a decline, or other notification.

However, the size of the keyboard and display on a mobile device constrains the consumer's ability to type or enter needed information, such as billing or authentication information, resulting in difficulty in accurately and quickly capturing the input from the consumer. As a result, the user may make typing errors when entering information into a mobile device. This may lead to processing delays in the transaction, cancelled orders, and consumer frustration. Therefore, a need exists for users to be able to enter information via a mobile device without the disadvantages of conventional methods.

Figure 1:
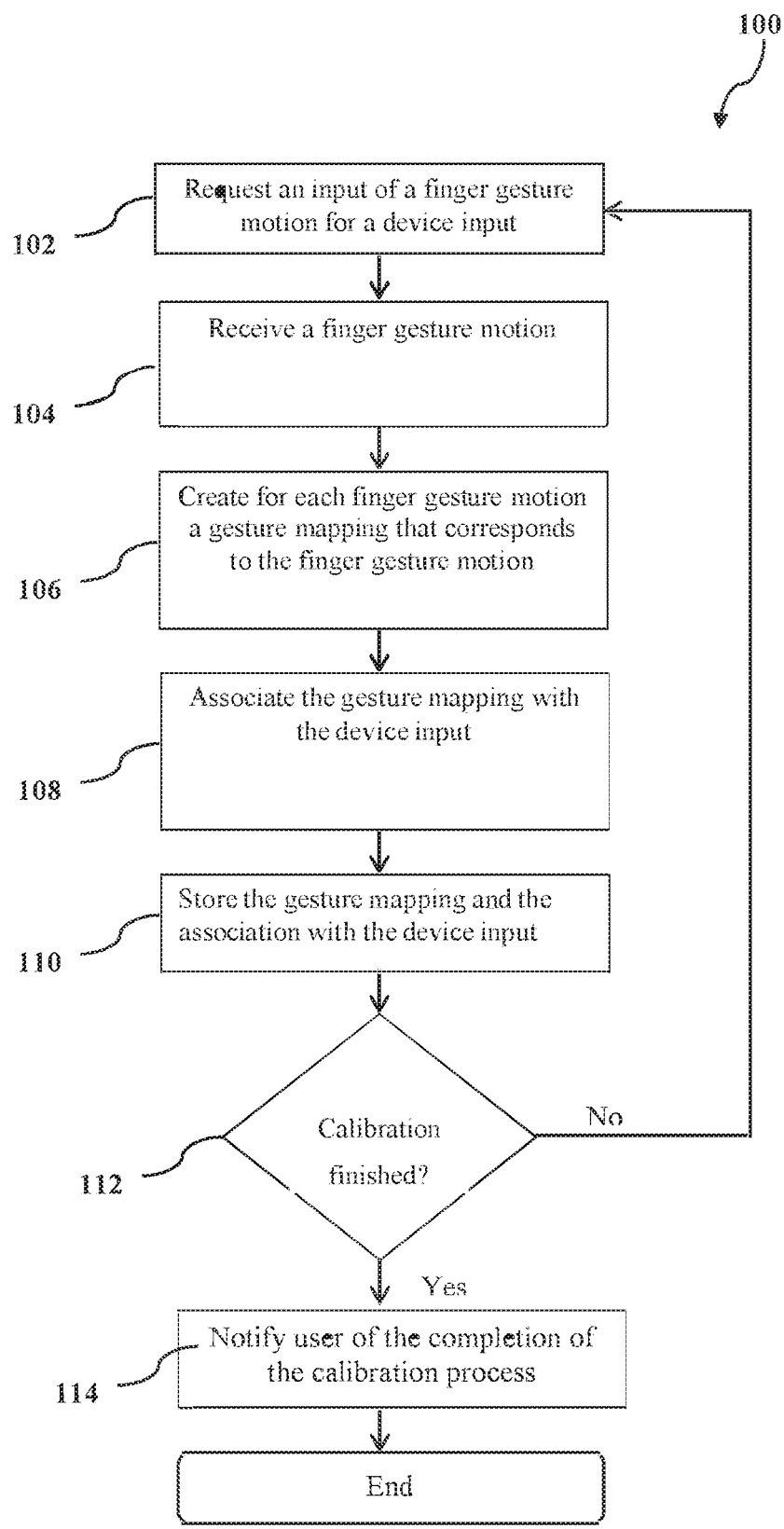
FIG. 1 is a flowchart showing a process for calibrating a gesture identification system according to one embodiment.

Embodiments of the present disclosure and their advantages are best understood by referring to the detailed description that follows. It should be appreciated that reference numerals are used to identify similar elements illustrated in one or more of the figures, wherein showings therein are for purposes of illustrating embodiments of the present disclosure and not for purposes of limiting the same.

DETAILED DESCRIPTION

According to one embodiment of the disclosure, a gesture identification system processes data input through user finger gestures captured from a user device. The system receives input of one or more finger gesture motions made by a user and sensed by a user device, where the input is made without the user touching the user device and the one or more finger gesture motions correspond to keys of a QWERTY keypad or to a specific spatial position of one or more data inputs on a current display of the user device. The system then identifies a current gesture mapping based on the one or more finger gesture motions and accesses a database of a plurality of stored gesture mappings associated with finger gesture motions of the user. From this, the system matches the current gesture mapping with the stored gesture mappings and determines a corresponding device input based on the stored gesture mapping that matches the current gesture mapping. The system can then process the input as if the user typed the information directly into a keypad or virtual keyboard or selected/tapped one or more keys on the display of the user device.

In one embodiment, a user makes a typing motion in view of a camera to convey input, such as a password or PIN, into a webpage, form, field, toolbar, or an application. The user simply types with the user's finger anywhere in view of a camera without requiring the user to type on a virtual or physical keyboard. The camera captures the user's finger motions, and a gesture identification system converts the motions into system input. In one embodiment, the finger gesture motion is not performed in contact with a physical user device and is detected via non-contact sensors. A sensor device such as a camera or motion sensor can be used to detect the motion. In another embodiment, the finger gesture motions are in contact with a physical sensor that connects to the user device. The sensor device may also be a device such as an accelerometer, controller, or glove-like device that is connected to the user device. The system then displays the corresponding input onto the screen.

Other types of user actions include tapping, swiping, and coordinated finger motions involving one or more fingers to perform application, browser, operating system, or device functions. For example, the user may calibrate the system to expand a webpage when the left and right index fingers move in opposite directions. In another embodiment, a finger motion in the shape or form of the letter or character, typically conveyed by hitting the letter or character on the keyboard, is used to input the character into the system and displayed on the screen. In one embodiment, the finger gesture motions are associated with device input, such as keystrokes on a QWERTY keyboard for inputting typed information into the back-end entity or to a specific spatial position of one or more data inputs on the current display of the user device.

In one embodiment, the gesture identification system captures a user's finger gesture motions using a camera. The finger gesture motion may involve swiping, dragging, typing, tapping or other motion or combination of motions. In another embodiment, the finger gesture motion may be a checkmark or in the form of an alphanumeric character. The system converts the motions into device input for a back-end entity (e.g. webpage, operating system, or other application)

via a user device, such as a mobile phone, PC, tablet, or other computing device. In other embodiments, the finger gesture motion represents cursor motions, such as clicking, double clicking, moving the mouse cursor, scrolling, dragging, dropping objects, grouping objects, or other such actions.

Thus, the user is provided a unique way to provide input into a user device, particularly a smartphone device or other such small handheld device, without having to manipulate more smaller-scaled input devices that accompany handheld devices. A further advantage is that the information may be more secure from people looking over the user's shoulders to obtain a user's confidential information, such as a password. It is much more difficult for a fraudster to determine the keys entered when the user simply moves fingers in the air as opposed to seeing where the user has pressed actual keys from a display or physical keyboard.

It is understood that the following disclosure provides different embodiments, or examples, for implementing different features of the disclosure. Specific examples of components and arrangements are described below to simplify the present disclosure. These are, of course, merely examples and are not intended to be limiting. Moreover, the formation of a first feature over or on a second feature in the description that follows may include embodiments in which one or more of the first and second features are formed in direct contact, and may also include embodiments in which additional features may be formed interposing the first and second features such that the first and second features may not be in direct contact. Various features may be arbitrarily drawn in different scales for the sake of simplicity and clarity. It is noted that the same or similar features may be similarly numbered herein for the sake of simplicity and clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure, unless otherwise noted herein.

As used herein, the singular forms "a," "an," and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. The term "and/or" includes all combinations of one or more of the associated listed items.

It will be understood that although the terms "first," "second," "third," and so on, may be used herein to describe various elements, steps, or devices, the elements, steps, or devices should not be limited by these terms. These terms are only used to distinguish one element, step, or device from another element or device. Thus, a first element, step, or device discussed below could be termed a second element, step, or device without departing from the teachings of the present disclosure.

It is understood that one or more processing steps and/or features of a device may be only briefly described, such steps and/or features being well known to those of ordinary skill in the art. Also, additional processing steps or features can be added and certain processing steps or features can be removed and/or changed while still implementing the claims. One or more processing steps can also be omitted, performed in a different sequence, or combined. Thus, the following description should be understood to represent examples only, and are not intended to suggest that one or more steps or features is required.

Example methods and systems to perform gesture identification to generate, manage, navigate, and/or provide device input are described. In the following description, for purposes of explanation, numerous specific details are set forth in order to provide a thorough understanding of example embodiments. It will be evident, however, to one skilled in the art that the present disclosure may be practiced without these specific details.

The gesture identification system recognizes finger gesture motions and associates the finger gesture motions to a corresponding device input for an application, browser, or any other resource that accepts user input or information, including, for example, an operating system, on a computing device. Finger gesture motion(s) include motions made by one or more fingers. The gesture identification system may include a sensor device, including, for example, a motion sensor, an accelerometer, wired gloves, a camera, a stylus, and/or a controller. The sensor device receives an input of one or more finger gesture motions and sends the input to a processor. The processor identifies a corresponding gesture mapping for each finger gesture motion and accesses a database of stored gesture mappings to match the gesture mapping with a stored gesture mapping associated with the user device. The stored gesture mapping corresponds to a device input that is provided as input to an application, browser, or other resource that accepts user input. In one embodiment, the finger gesture motions are used to convey information typically typed on a QWERTY keyboard to fill out forms, documents, fields, toolbars, or other such input fields that require alphanumeric or ASCII user input. In other embodiments, the finger gesture motions convey functions, such as selecting, copying, pasting, zooming, and scrolling, performed by other device input devices, such as a mouse, trackball, stylus or voice.

FIG. 1 is a flowchart 100 showing a process for calibrating a gesture identification system according to at least one embodiment. In one embodiment, the system calibration is for a specific user or device. The system maintains separate user profiles for which would contain different calibration settings for different users and/or devices. The user may have to login into or create a user profile to calibrate the system. In another embodiment, the system calibration is not user or device specific. At step 102, the gesture identification system displays a request for an input of a finger gesture motion that corresponds to a device input. The display of the request may be displayed through a user device, such as a mobile phone, PC, table, laptop, or other computing device. In one embodiment, the request may be that of a single character. In another embodiment, the request may be for a certain phrase, sentence, email address, user name, phone number, password, personal information, etc., such that the system can calibrate finger movements specific for each user and possibly also for specific input that may be commonly used, such as login credentials.

The display presented to the user at step 102 may be in response to a request from the user, such as initiating a transaction, or as part of, including completion of, a transaction. In one example, the user is requested to enter a password. In response to the seeing the display requesting the user for an action, the user performs one or more finger gesture motions. The finger gesture motion may correspond to a device input, such as a click or double-click of a mouse on a specific portion of the display showing a button, link, or box, keyboard input including alphanumeric characters and/or other ASCII representation, stylus or pointer motion, or other types of manipulation performed by device inputs.

The required device input may provide input to a form in a web browser, application, or interface with the operating system. The input may comprise of an input of login credentials, address information, user contact information, or other such commonly requested information from the user. In other embodiments, the device input provides other capabilities to interact with the web browser, application, or operating system, such as zooming, scrolling, selecting, or may act as a preconfigured shortcut and assigned to a designated function, for example, copying, cutting, pasting, printing, searching, or highlighting. In another embodiment, the finger gesture motion may correspond to device input associated with customizable functions or features, such as an electronic signature or personalized attribute. The gesture motion may correspond to a payment confirmation, button selection, or other such selection of a button at a specific location on the user device display.

In one embodiment, the user may be requesting access to a user account, which requires authentication or a login. In response, the displayed request may ask the user to enter alphanumeric text, such as an email address, user name, and/or password/PIN, by moving the user's fingers corresponding to a QWERTY keyboard configuration in front of a camera, sensor device, or display screen of the user device.

After displaying the request at step 102, the sensor device, at step 104, captures and receives a finger gesture motion through the sensor device, such as a motion sensor, an accelerometer, wired gloves, a camera, a stylus, and/or a controller. The device converts the motion to a signal for processing and transmission. Transmission may be through any suitable communication medium, such as through a data bus, wired device, or wireless device. Sensor information may include the speed of the finger motion, relative location of the motion based on the start and endpoint of the finger in relation to previous motions or a reference point, and the path of the finger motion.

Once the user performs the gesture motion, the corresponding signal is transmitted and detected at step 104. In another embodiment, the sensor information for all the fingers is considered together in determining the corresponding device input. In yet another embodiment, only relevant sensor information for a finger gesture motion is considered and inconsequential finger gesture motion sensor information is disregarded. The relevance of the sensor information is determined by a tolerance or threshold level established as part of the calibration process or set as a default or preferred setting. In one embodiment, the finger gesture motions do not need to correspond to the size of the typical device input associated with the user device, for example, the user may type ordinarily as one would type on a standard computer QWERTY keyboard and calibrate one's motions based on the standard keyboard to correspond with device input associated with the QWERTY keyboard on a smartphone. In another embodiment, the gesture motion may mimic the selection of a button, selection of an item, or function on the display without touching the display or user device. For example, the user may move their finger to a position corresponding to a specific location of a button on a checkout or payment page or the user may drag their finger to select a group of icons.

In one embodiment, the system may ask the user to repeat the finger motion (one or more times) to better calibrate the motion. If the subsequent motion does not match the previous motion(s), the user may be asked to repeat as often as necessary for the system to detect consistent motions. Tolerances may be dependent on system or device requirements. In one embodiment, two or more motions are averaged to obtain the calibrated motion.

At step 106, the system takes the received or averaged finger gesture motion and creates a gesture mapping that corresponds to the finger gesture motion. In one embodiment, the gesture mapping is created by connecting discrete points along a representation of the path taken by the finger motion. The discrete points represent the path taken by the finger motion, and thus, create the mapping which is then associated with a device input. For example, a finger motion in the form of the letter "L" may create discrete points as the finger travels from the top to bottom in a straight vertical line and then from left to right, horizontally, forming a right angle to create a gesture mapping associated with the capital letter "L."

In another embodiment, the gesture mapping is created by determining the relative location of the ending position of a finger motion in comparison to prior endpoints. For example, the standard hand position on a keyboard presumes the left index finger is placed on the "f" key and the right index finger is on the letter "j." As different letters are displayed for calibration to the user, the sensor detects the finger and hand motions relative to the initial locations of the prior inputs and determines a relative mapping based on those prior inputs.

In another embodiment, a checkmark motion or dollar sign motion may be associated with the confirmation of a sale order or the click of a purchase or other such button. The creation of the gesture mapping may include the combination of one or more finger gesture motions involving one or more fingers. In another embodiment, the gesture mapping may be a combination of letters forming a phrase, sentence, or other such grouping of characters, such as in a pattern the user would type on a QWERTY keyboard.

Calibration can also be based on a relative location of a button or link for a specific page displayed on the user device. For example, within a checkout page, there may be a "buy" or "confirm" button and a "cancel" button, with the "buy" button located to the left of the display and the "cancel" button located to the right. The system may show the user a checkout page for a particular service provider or merchant and ask the user to make the same motion the user would make to select the "buy" button and the same motion the user would make to select the "cancel" button. The spatial movement and beginning and end location of the finger may be calibrated to correspond to and match to the selection of the particular button.

Thus, as seen, there may be various ways to calibrate non-contacting finger(s) gestures or movements to specific information or input intended by the user. As such, the above examples are non-limiting.

In response to creating a gesture mapping based on the received finger gesture motion, at step 108, the gesture mapping is associated with a specific type of device input. Both the gesture mapping and the association with the device input are stored at step 110. The association of the gesture mapping and the device input may include the association of the combination of one or more finger gesture motions involving one or more fingers associated with one or more actions, functions, or device inputs. The order of the gesture motions may define a different function or a different order to perform the associated actions. The association is also stored in a database so that the association may be later queried, updated, or modified. In another embodiment, the association is also stored in a table lookup where the association is prioritized in a table based upon the frequency of use to allow for faster lookup. The table lookup may be associated with one or more user profiles associated with one or more users or user devices. For example, the table lookup may be based on the user's history. The user may also perform certain actions more than other actions, e.g. selecting a pay button. In another embodiment, the table lookup may be associated with the actions of all users on the system. In another embodiment, the user profile may be a group profile.

After the gesture mapping and the association have been stored, the system determines if additional device input requires calibration, at step 112. If for some reason the gesture is not recognizable, for example, the motion was out of view of the camera, the sensor was disconnected, the motion was outside the defined tolerances for the gesture mapping, or the motion was not otherwise recognized, the system may request the user to repeat the action or enter a different finger gesture motion. In another embodiment, the system may request that the user determine if the system requires further calibration. In yet another embodiment, the determination to end the calibration process is automatic. The end of the calibration process may be determined based upon the complete gesture mapping and association to a predetermined set of device inputs. In another embodiment, the user may end or terminate the calibration process via a user interface or input. If the system requires no further calibration, the system, at step 114, notifies the user of the completion of the calibration process and enters into a receive state awaiting the receipt of an inputted finger gesture motion. In one embodiment, notification may be through a message on the display. In another embodiment, an external indicator such as light, audio, text message, or another communication device indicates to the user the completion of the calibration process. Otherwise, the system returns to step 102 to await the next finger gesture motion to calibrate the next device input.

Figure 2:
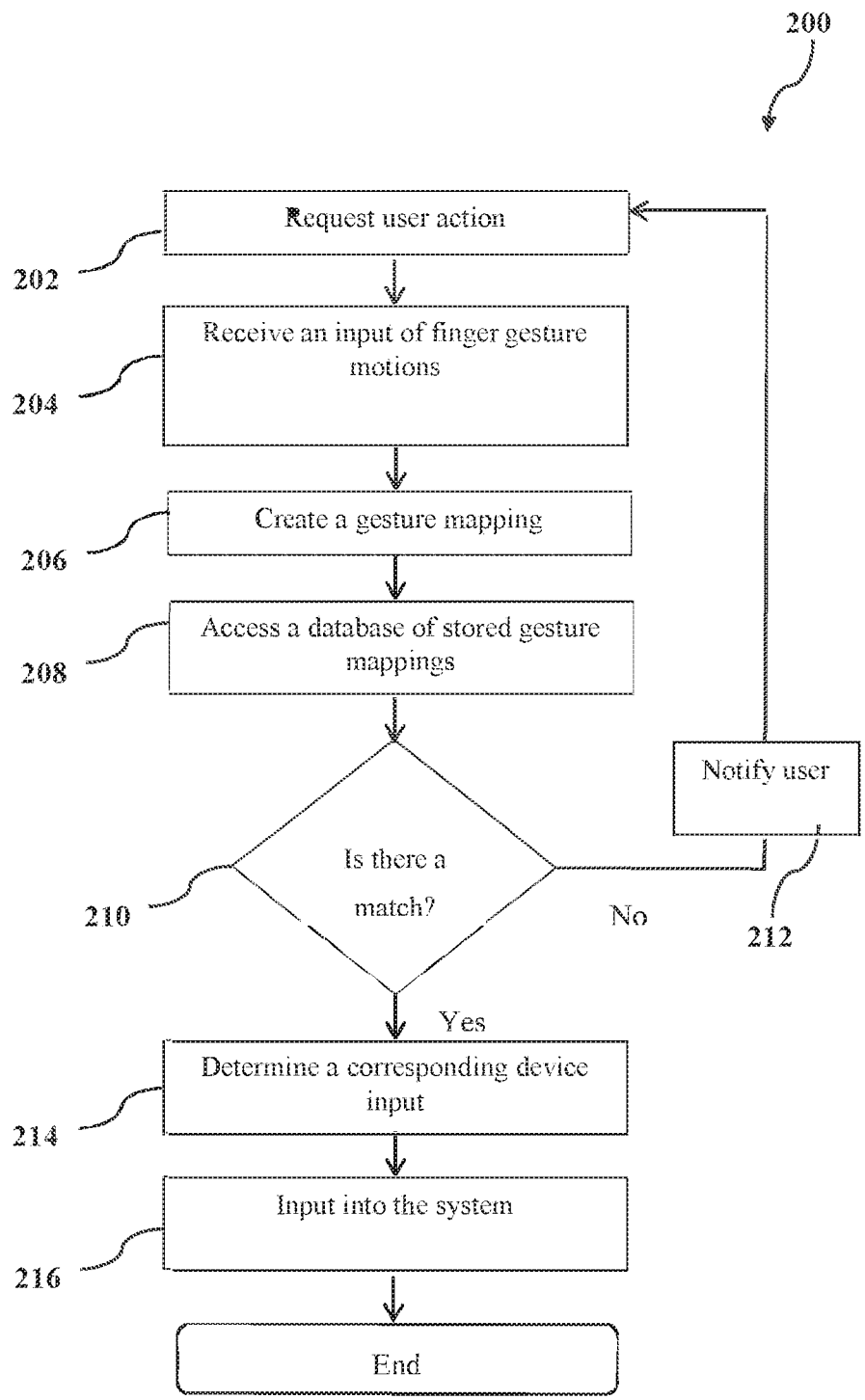
FIG. 2 is a flowchart showing a process for a gesture identification system that generates input for a back-end entity according to one embodiment.

FIG. 2 is a flowchart 200 showing a process for a gesture identification system that generates input for a back-end entity according to at least one embodiment. The back-end entity may be any type of system or person who processes a user action, such as a financial institution, a payment provider, a merchant or seller, service provider, or an on-line marketplace. Generally, the back-end device presents a display, in step 202, that requires user input, for example, to fill out payment, billing, authentication, identification, or shipment information.

The sensor device, at step 202, awaits an indication to receive and capture finger gesture motions. In one embodiment, the indication is a user indication such as a mouse click, keyboard input, audio command, or any other user input that identifies the field or location to enter the input. In another embodiment, a unique gesture motion captured or received by the gesture identification system may indicate the start of the receiving process.

The sensor device, at step 204, captures and receives a finger gesture motion through a sensor, such as a motion sensor, accelerometer, wired gloves, camera, stylus, and/or controller. The device processes the motion converting the movement to a signal for processing and transmission. Transmission may be through any suitable communication medium, such as through a data bus, wired device, or wireless device. Sensor information may include the speed of the finger motion, relative location of the motion based on the start and endpoint of the finger in relation to previous motions or a reference point, and/or the path of the finger motion.

Next, at step 206, the system converts the sensor information and creates a gesture mapping based on the sensor information. The system associates the created gesture mapping with that of the gesture motions. In one embodiment, all the finger gesture motions are considered and the system converts the corresponding finger gesture motions to create a gesture mapping. The gesture mapping may be based on discrete points along the path of the finger motion. In yet another embodiment, only relevant sensor information for a finger gesture motion is considered and inconsequential finger gesture motion sensor information is disregarded. The relevance of the sensor information is determined by a tolerance or threshold level established as part of the calibration process or set as a default or preferred setting. In one embodiment, the finger gesture motions do not need to correspond to the size of the typical device input associated with the user device, for example, the user may type ordinarily as one would type on a standard computer QWERTY keyboard and calibrate one's motions based on the standard keyboard to correspond with the device input associated with the QWERTY keyboard on a smartphone. In another embodiment, the gesture mappings are associated with the finger motions relative to the other fingers or the endpoint of the finger motions.

Once the gesture mapping is created or the finger motion is determined, in step 206, the system accesses a database of stored gesture mappings, in step 208. The system determines if the created gesture mapping or finger motion corresponds to or matches with a stored gesture mapping or finger motion, in step 210. In one embodiment, the matching accounts for differences between the two mappings, such that the motions do not have to be exact. For example, the determination may allow for differences within a certain threshold or allow for error by setting an allowed tolerance. The system accounts for the tolerance or threshold in the differences between the current gesture mapping and the stored gesture mapping. The system recognizes a match so long as the current gesture mapping is within the tolerance or error threshold of the stored gesture mapping. The tolerance may be application, system, user, or action specific. For example, authentication may have a lower tolerance than page navigation or search term entry.

In another embodiment, the system may account for the user environment allowing for more tolerance in certain situations, such as when the user is mobile. In one embodiment, the system keeps track of frequently used inputs in a separate storage area allowing for faster access, such as flash, RAM, or cache. The tracking of the used inputs may be associated with a user profile that includes a user history. In one embodiment, the user profile may be associated with a single user. In another embodiment, the user profile may be associated with multiple users or a group. The user history may contain information regarding the inputs entered by a specific user. The user history may also contain additional information to allow the system to anticipate the user input based on previous inputs such as pre-filling a form based on a past transaction.

The system, in step 210, determines if the gesture motion is recognizable and if there is a match. In one embodiment if there is no match to a stored gesture mapping, the system will notify the user, as in step 212, and await the receipt of the next action in step 202. In one embodiment, notification to the user may be through a message on a display or other such user interface. In another embodiment, notification may be through an alternative indicator such as an external visual or audio indication.

If there is a match, the corresponding device input associated with the stored gesture mapping is determined, in step 214. The finger gesture motion may correspond to a device input, such as a click or double-click of a mouse, keyboard input including alphanumeric characters and/or other ASCII representation, stylus or pointer motion, or other types of manipulation performed by device inputs. The device input may provide input to a form in a web browser, application, or interface with the operating system. In other embodiments, the device input provides other capabilities to interact with the web browser, application, or operating system, such as zooming, scrolling, selecting, or may act as a preconfigured shortcut and assigned to a designated function, for example, copying, cutting, pasting, printing, searching, or highlighting. In another embodiment, the finger gesture motion may correspond to device input associated with customizable functions or features, such as an electronic signature or personalized attribute. In response to recognizing the gesture motion, the user may be notified by the system of a successful input.

In another embodiment, the determined input or action associated with the gesture motion may be displayed to the user for confirmation. For example, if the gesture motion indicated a specific word or phrase, the user may be displayed the work or phrase and asked to confirm or edit as needed.

The corresponding device input, in step 216, is used as input into the system. In one embodiment, the device input may fill out a form or input field in a back-end entity such as a webpage. In another example, the device input corresponds to a user password, which is then used to authenticate the user. Thus, input corresponding to the non-contact finger gesture motion may be processed as if the user actually entered or selected information through a keypad or touch screen.

Figure 3:
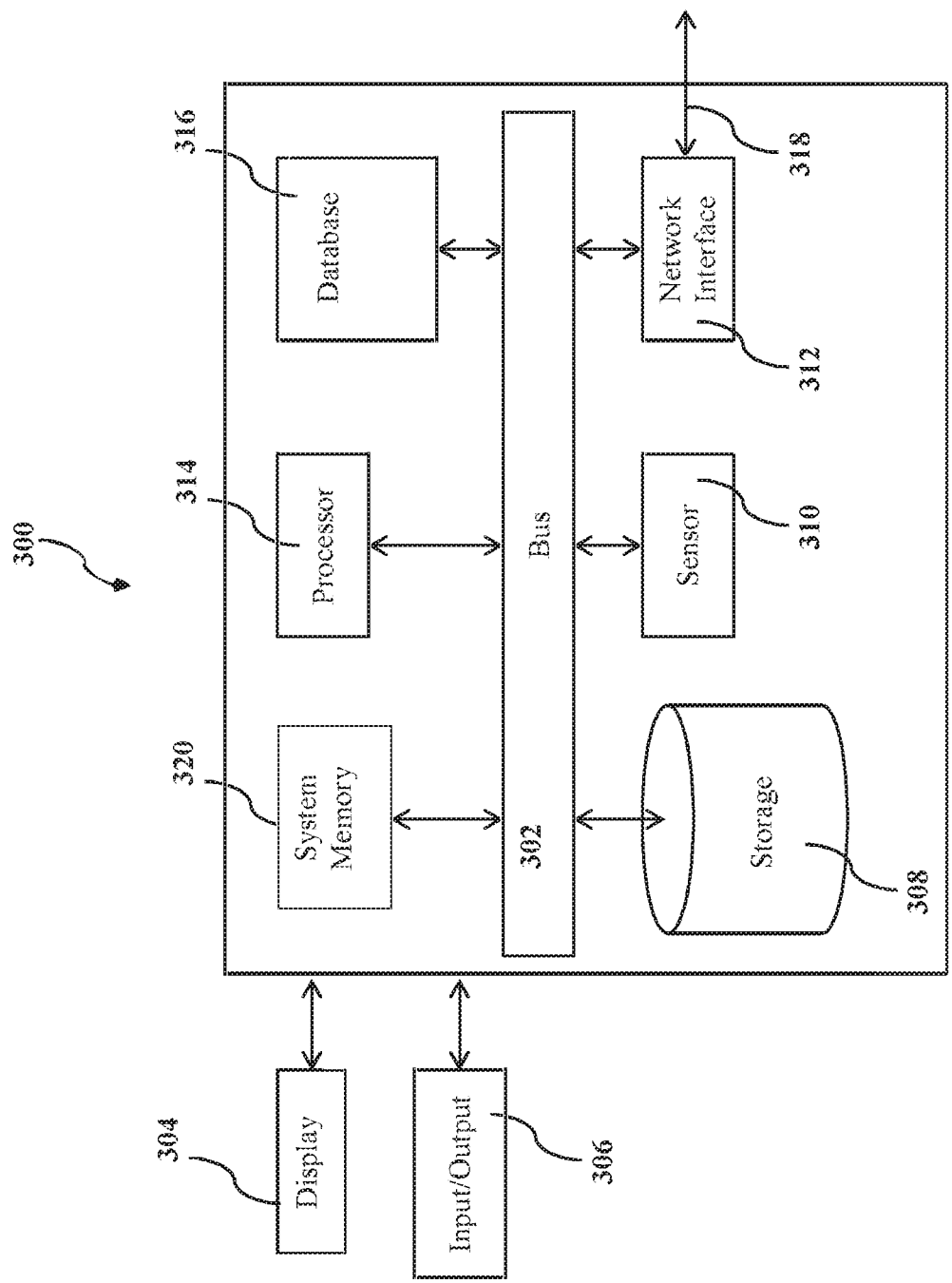
FIG. 3 is a block diagram of a computer system suitable for implementing one or more components of FIG. 2 according to one embodiment of the present disclosure.

FIG. 3 is a block diagram of a computer system 300 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 300 in a manner as follows.

Computer system 300 includes a bus 302 or other communication mechanism for communicating information data, signals, and information between various components of computer system 300. Components include one or more input/output (I/O) components 306 that process a user action, such as finger gesture motions, and send a corresponding signal to bus 302 for processing. I/O component(s) 306 may also include an output component, such as a display 304, which may be a touchscreen or other type of display device. Finger gesture motions may be detected by a sensor 310, such as a camera or other type of sensor described herein.

A network interface 312 transmits and receives signals between computer system 300 and other devices, such as another user device, a web server, or a payment provider server via network 318. In one embodiment, the transmission is wireless, although other transmission mediums and methods may also be suitable. One or more processor(s) 314, which can be a micro-controller, digital signal processor (DSP), or other processing component, processes these various signals, such as for display on computer system or transmission to other devices via a communication link. Processor(s) 314 may also control transmission of information, such as cookies or IP addresses, to other devices.

Components of computer system 300 also include a system memory component 320 (e.g., RAM), a static storage component 308 (e.g., ROM), and/or a disk drive. Computer system 300 performs specific operations by processor 314 and other components by executing one or more sequences of instructions contained in system memory component 320. Logic may be encoded in a computer readable medium, which may refer to any medium that participates in providing instructions to processor(s) 314 for execution. Some frequently used logic may be stored in cache for faster access. Such a medium may take many forms, including but not limited to, non-volatile media, volatile media, and transmission media. In various implementations, non-volatile media includes optical or magnetic disks, volatile media includes dynamic memory, such as system memory component 320, and transmission media includes coaxial cables, copper wire, and fiber optics, including wires that comprise bus 302. In one embodiment, the logic is encoded in non-transitory computer readable medium.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

The computer system 300 also includes a database 316 to perform gesture mapping lookup based on the received finger gesture motions and the stored gesture mappings in the storage device. In one embodiment, the database 316 may allow for the definition, creation, querying, updating, and overall administration of the database to capture and analyze data. The database 316 may be designed using MySQL, Oracle, SAP, Microsoft SQL, Microsoft Access, or another Database Management System.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 4:
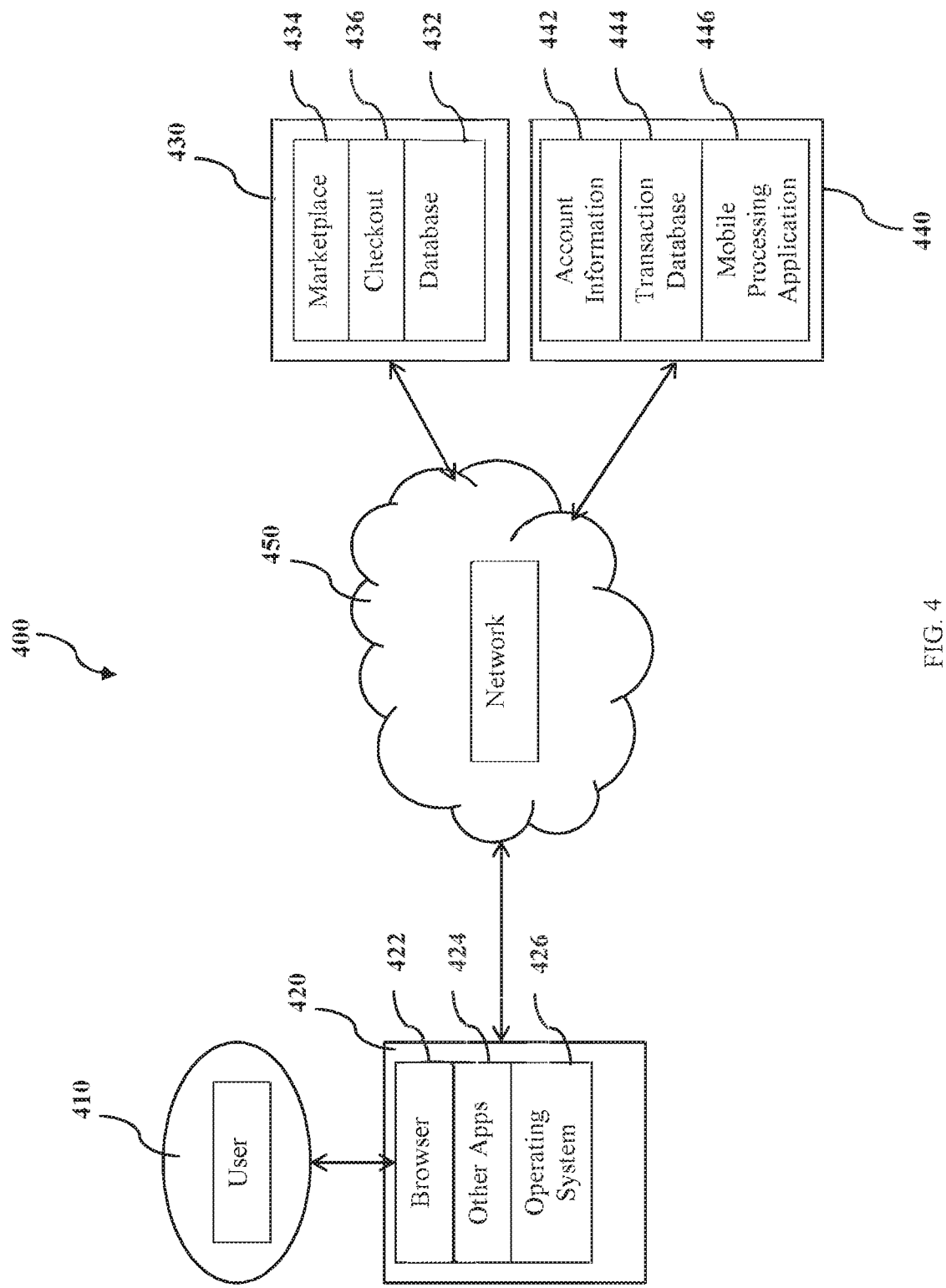
FIG. 4 is a block diagram of a networked system configured to handle a transaction using gesture identification according to one embodiment.

FIG. 4 is a block diagram of a networked system configured to handle a transaction using gesture identification according to at least one embodiment, such as described above. System 400 includes a user 410, a user device 420, web server 430, and/or other user device 440 in communication over a network 450. The web/merchant server 430 may be maintained by a payment provider, such as PayPal, Inc. of San Jose, Calif. The web/merchant server displays a web page or form on the client device 420 through the network 450. The user 410, such as the sender or consumer, fills out a form displayed on the client device 420 to communicate information and transact with the web/merchant server 430.

User device 420, web server 420, and other user devices 440 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 450.

Network 450 may be implemented as a single network or a combination of multiple networks. For example, in various embodiments, network 450 may include the Internet or one or more intranets, landline networks, wireless networks, cellular networks and/or other appropriate types of networks.

User device 420 may be implemented using any appropriate hardware and software configured for wired and/or wireless communication over network 450. For example, in one embodiment, the user device may be implemented as a computing tablet, personal computer (PC), a smart phone, personal digital assistant (PDA), laptop computer, and/or other types of computing devices capable of transmitting and/or receiving data.

User device 420 may include one or more browser applications 422 which may be used, for example, to provide a convenient interface to permit user 410 to browse information available over network 450. For example, in one embodiment, browser application 422 may be implemented as a web browser configured to view information available over the Internet. User device 420 may also include other applications 424 which may be used, for example, to provide client-side processing for performing desired tasks in response to operations selected by user 410. The other applications 424 may be desired in particular embodiments to provide desired features to user device 420. For example, other applications 424 may include security applications for implementing client-side security features, programmatic client applications for interfacing with appropriate application programming interfaces (APIs) over network 450, or other types of applications. Applications 424 may also include email, texting, voice and IM applications that allow user 410 to send and receive emails, calls, and texts through network 450, as well as applications that enable the user to communicate, place orders, and make payments through the payment provider as discussed above.

User device 420 may also include an operating system 426 which requires navigation through windows, toolbars, screens, or icons that require selecting, scrolling, clicking, zooming, and other features, such as cutting, pasting, selecting, or clicking.

Web server 430 may be maintained, for example, by a merchant or seller offering various products and/or services in exchange for payment to be received over network 450. Generally, web server 430 may be maintained by anyone or any entity that receives money, which includes charities as well as retailers and restaurants. Web server 430 includes a database identifying available products and/or services (e.g., collectively referred to as items) which may be made available for viewing and purchase by user 410, including receipts associated with identifiers, such as barcodes. In one embodiment, user 410 may interact with marketplace application 434 through browser applications over network 450 in order to view various products, food items, or services identified in database 432. The user then uses the checkout application 436 to purchase the product, item, or service.

A payment service provider 440 may interact with the webserver 430 to complete a transaction based on the input provided by user 410 into user device 420. The payment service provider may include account information 442 pertaining to a plurality of users. In one embodiment, the payment service provider 440 includes a transaction database 444 that holds the historical transactions of each user 410. In one embodiment, the payment service provider 440 may also include a mobile processing application 446 that permits ease of use and display of transactions on a mobile device.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to execute instructions from the non-transitory memory to cause the system to perform operations comprising:
     capturing, by a sensor associated with the system, a first gesture motion associated with an action on the system;
     accessing a database of a plurality of stored gesture mappings, wherein the plurality of stored gesture mappings are previously created to correspond to gesture motions from a user;
     determining whether the captured first gesture motion corresponds to any of the plurality of stored gesture mappings, wherein the captured first gesture motion corresponds to at least one stored gesture mapping of the plurality of stored gesture mappings when the captured first gesture motion is within a first threshold of differences, and wherein the first threshold of differences is based on at least one first condition associated with the system being satisfied;

mapping, in response to the captured first gesture motion corresponding to the at least one stored gesture mapping of the plurality of stored gesture mappings, the captured first gesture motion to the at least one stored gesture mapping;

determining the action on the system based on the mapping of the captured first gesture motion;

in response to the determining the action, executing the action on the system associated with the captured first gesture motion;

determining that at least one second condition associated with the system is satisfied such that a second threshold of differences is enabled, wherein the second threshold of differences provides a second error tolerance that is different than a first error tolerance provided by the first threshold of differences;

capturing, by the sensor associated with the system, a second gesture motion that would be associated with the action according to the first threshold of differences;

determining that the captured second gesture motion does not correspond to any of the plurality of stored gesture mappings based on the captured second gesture motion not being within the second threshold of differences; and ignoring the captured second gesture motion.

2. The system of claim 1, wherein the captured first gesture motion includes a finger gesture motion captured by the sensor on the system.

3. The system of claim 1, wherein the determining whether the captured first gesture motion corresponds to any of the plurality of stored gesture mappings further includes converting the captured first gesture motion to a corresponding gesture mapping.

4. The system of claim 3, wherein the mapping is based on discrete points along a path of the captured first gesture motion.

5. The system of claim 3, wherein the operations further comprise:
tracking a frequency of the captured first gesture motion; and
in response to the tracking, prioritizing a corresponding stored gesture mapping in the database.

6. The system of claim 1, wherein the mapping is within a tolerance of error.

7. The system of claim 1, where the action on the system includes a payment processing.

8. A method comprising:
capturing, by a sensor on a system, a first gesture motion associated with an action on the system;
determining whether the captured first gesture motion corresponds to any of a plurality of stored gesture mappings that are previously created to correspond to gesture motions from a user, wherein the captured first gesture motion corresponds to at least one stored gesture mapping of the plurality of stored gesture mappings when the captured first gesture motion is within a first threshold of differences, and wherein the first threshold of differences is based on at least one first condition that is based on at least one of the action, an application associated with the action, the system, the user, or a user environment;
determining the action on the system based on a mapping between the captured first gesture motion and the at least one stored gesture mapping of the plurality of stored gesture mappings, wherein the plurality of stored gesture mappings are each associated with at least one action;
in response to the determining the action, executing the action on the system associated with the gesture motion captured;
determining that at least one second condition associated with the system is satisfied, and in response, changing the first threshold of differences to a second threshold of differences, wherein the second threshold of differences provides a second error tolerance that is different than a first error tolerance provided by the first threshold of differences;
capturing, by the sensor associated with the system, a second gesture motion that would be associated with the action according to the first threshold of differences;
determining that the captured second gesture motion does not correspond to any of the plurality of stored gesture mappings based on the captured second gesture motion not being within the second threshold of differences; and
ignoring the captured second gesture motion.

9. The method of claim 8, wherein the first gesture motion includes a finger gesture motion captured by the sensor on the system.

10. The method of claim 8, wherein the determining whether the captured first gesture motion corresponds to any of the plurality of stored gesture mappings that are previously created to correspond to the gesture motions from the user further includes converting the first gesture motion captured to a corresponding gesture mapping.

11. The method of claim 10, wherein the mapping is based on discrete points along a path of the first gesture motion.

12. The method of claim 10, further comprising:
tracking a frequency of the captured first gesture motion; and
in response to the tracking, prioritizing the corresponding gesture mapping in a database.

13. The method of claim 8, wherein the mapping is within a tolerance of error.

14. The method of claim 8, where the action on the system includes a payment processing.

15. A non-transitory machine-readable medium having stored thereon machine-readable instructions executable to cause a machine to perform operations comprising:
capturing, by a sensor associated with a system, a first gesture motion associated with an action on the system;
accessing a plurality of stored gesture mappings, wherein the plurality of stored gesture mappings are previously created to correspond to gesture motions from a user;
determining whether the captured first gesture motion corresponds to any of the plurality of stored gesture mappings, wherein the captured first gesture motion corresponds to at least one stored gesture mapping of the plurality of stored gesture mappings when the captured first gesture motion is within a first threshold of differences, and wherein the first threshold of differences is determined based on at least one monitored data category at a time the first gesture motion is captured;
mapping, in response to the captured first gesture motion corresponding to the at least one stored gesture mapping of the plurality of stored gesture mappings, the captured first gesture motion to the at least one stored gesture mapping of the plurality of stored gesture mappings;

determining the action on the system based on the mapping of the captured first gesture motion;

in response to the determining the action, executing, the action on the system associated with the captured first gesture motion;

determining the at least one monitored data category indicates that a second threshold of differences is to be monitored, and in response, changing the first threshold of differences to the second threshold of differences, wherein the second threshold of differences provides a second error tolerance that is different than a first error tolerance provided by the first threshold of differences;

capturing, by the sensor associated with the system, a second gesture motion that would be associated with the action according to the first threshold of differences;

determining that the captured second gesture motion does not correspond to any of the plurality of stored gesture mappings based on the captured second gesture motion not being within the second threshold of differences; and ignoring the captured second gesture motion.

16. The non-transitory machine-readable medium of claim 15, wherein the first gesture motion includes a finger gesture motion captured by the sensor on the system.

17. The non-transitory machine-readable medium of claim 15, wherein the determining whether the captured first gesture motion corresponds to any of the plurality of stored gesture mappings further includes converting the captured first gesture motion to a corresponding gesture mapping.

18. The non-transitory machine-readable medium of claim 17, wherein the mapping is based on discrete points along a path of the first gesture motion.

19. The non-transitory machine-readable medium of claim 17, wherein the operations further comprise:

tracking a frequency of the captured first gesture motion; and in response to the tracking, prioritizing a corresponding stored gesture mapping in a database.

20. The non-transitory machine-readable medium of claim 15, wherein the mapping is within a tolerance of error.

* * * * *